United States Patent [19]

Edwards

[11] Patent Number: 4,622,143
[45] Date of Patent: Nov. 11, 1986

[54] DOUBLE-ENDED HOLLOW FIBER PERMEATOR

[75] Inventor: Donald W. Edwards, Wilmington, Del.

[73] Assignee: E. I. Du Pont de Nemours and Company, Wilmington, Del.

[21] Appl. No.: 751,142

[22] Filed: Jul. 2, 1985

[51] Int. Cl.$^4$ .............................................. B01D 13/01
[52] U.S. Cl. ............................ 210/321.1; 210/433.2; 210/439
[58] Field of Search .......................... 210/321.1–321.5, 210/433.2, 438, 439; 55/158

[56] References Cited

U.S. PATENT DOCUMENTS

| | | | |
|---|---|---|---|
| 3,554,379 | 1/1971 | Pye | 210/321.1 |
| 3,953,334 | 4/1976 | Brun et al. | 210/321.1 |
| 4,061,574 | 12/1977 | Clark | 210/321.2 |
| 4,080,296 | 3/1978 | Clark | 210/323.1 |
| 4,220,535 | 9/1980 | Leonard | 210/321.1 |
| 4,352,736 | 10/1982 | Ukai et al. | 55/158 |
| 4,451,369 | 5/1984 | Sekino et al. | 210/433.2 |

OTHER PUBLICATIONS

Product Bulletin No. 226, Permasep* Permeator, Du Pont.

*Primary Examiner*—John Adee

[57] ABSTRACT

A double-ended permeator. Permeate is extracted from both ends of a fiber bundle and discharged at one end only of a permeator.

7 Claims, 6 Drawing Figures

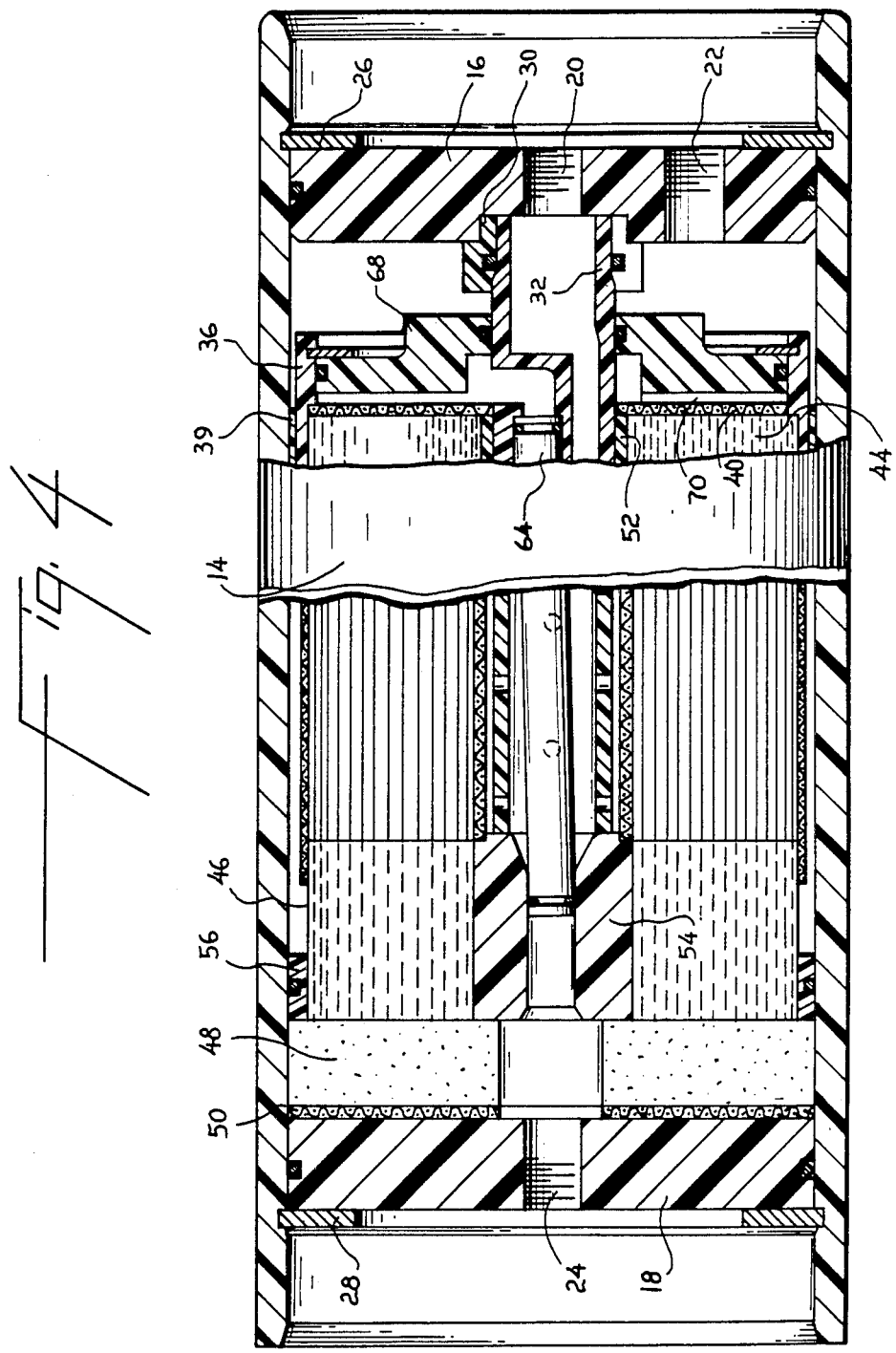

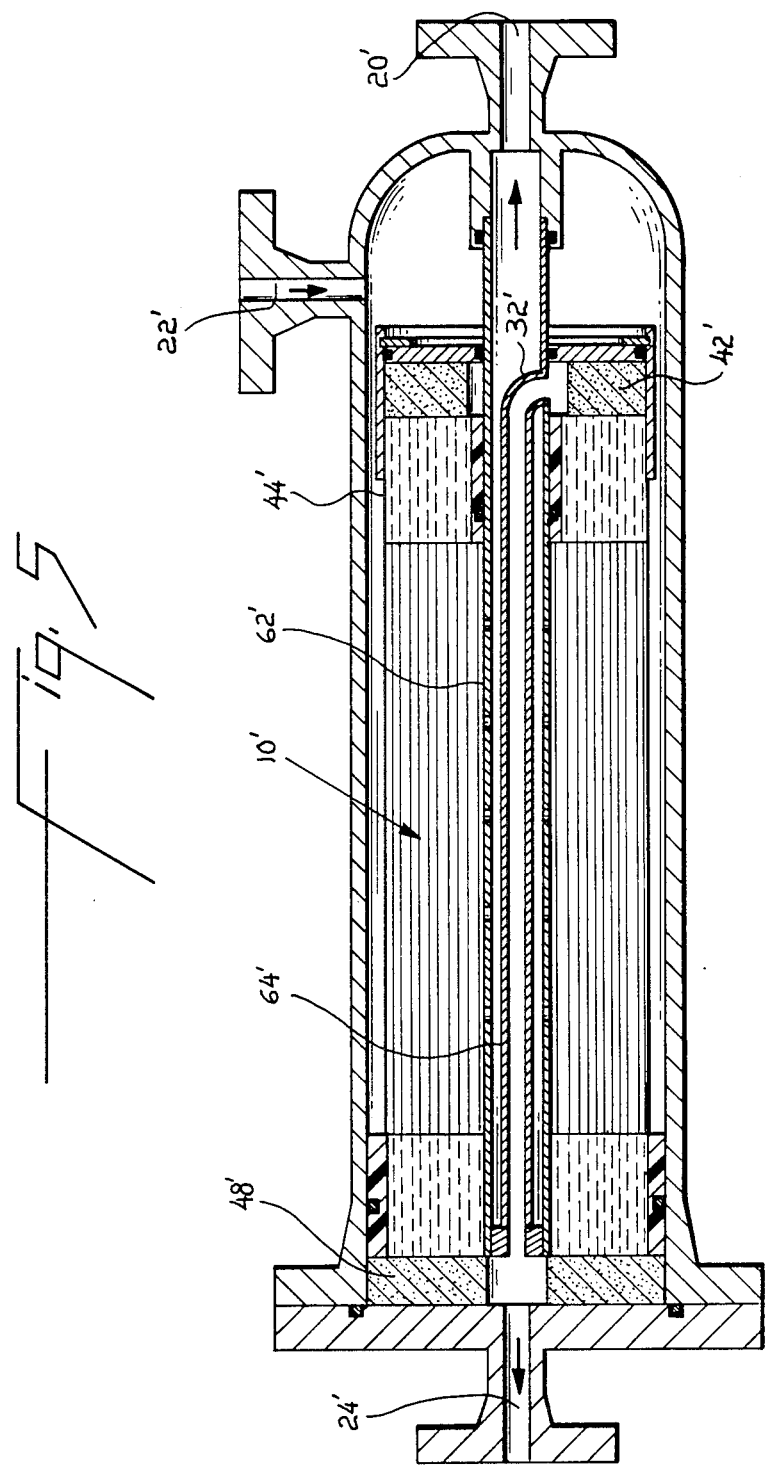

DOUBLE-ENDED HOLLOW FIBER PERMEATOR

BACKGROUND

This invention relates generally to the separation of fluids by selective permeation and, more particularly, to permeators of the type having a bundle of hollow fibers as the membrane.

It is know that the fibers in such a permeator can be either double-ended (DE) or single-ended (SE), the difference being that DE fibers are open at each end of the fiber bundle whereas SE fibers reverse at one end and open through a tube sheet at the other end. DE permeators are shown in U.S. Pat. No. 3,953,334 to Brun et al. Channelled end plates and multiple manifolds for the discharge of a permeate must be provided at each end of the permeator. A typical SE permeator is marketed by the assignee of the present invention under the trademark PERMASEP ®. An advantage of such a permeator is the minimum number of external fittings and their location in end plates, all of which lead to lower costs for associated piping and installation. However, as with all SE permeators, there is a rather high drop in pressure down the bores of the fibers and a consequent reduction in the throughput of permeate below what could be expected in the absence of such a pressure drop.

SUMMARY

Productivity has been improved with a double-ended permeator which includes an elongated casing having ports at the ends thereof and a perforated tube within an encased, tubular bundle of hollow fibers. There is an imperforate tube within the perforated tube and a dual passage connector is located at one end of the bundle. One passage connects a port with the perforated tube. The other passage connects the imperforate tube to the open ends of the fibers at that end of the bundle.

DRAWINGS

FIG. 1A is a fragmentary end view showing the open ends of hollow fibers embedded in a tube sheet.

FIG. 3 is a transverse cross/section taken on line 3—3 in FIG. 2.

FIG. 4 is a plan view of a third embodiment of the permeator. Parts have been broken away and shown in section to reveal details of construction.

FIG. 5 is a schematic cross section of a fourth embodiment adapted for use in the separation of gases.

DESCRIPTION

Figure 1:
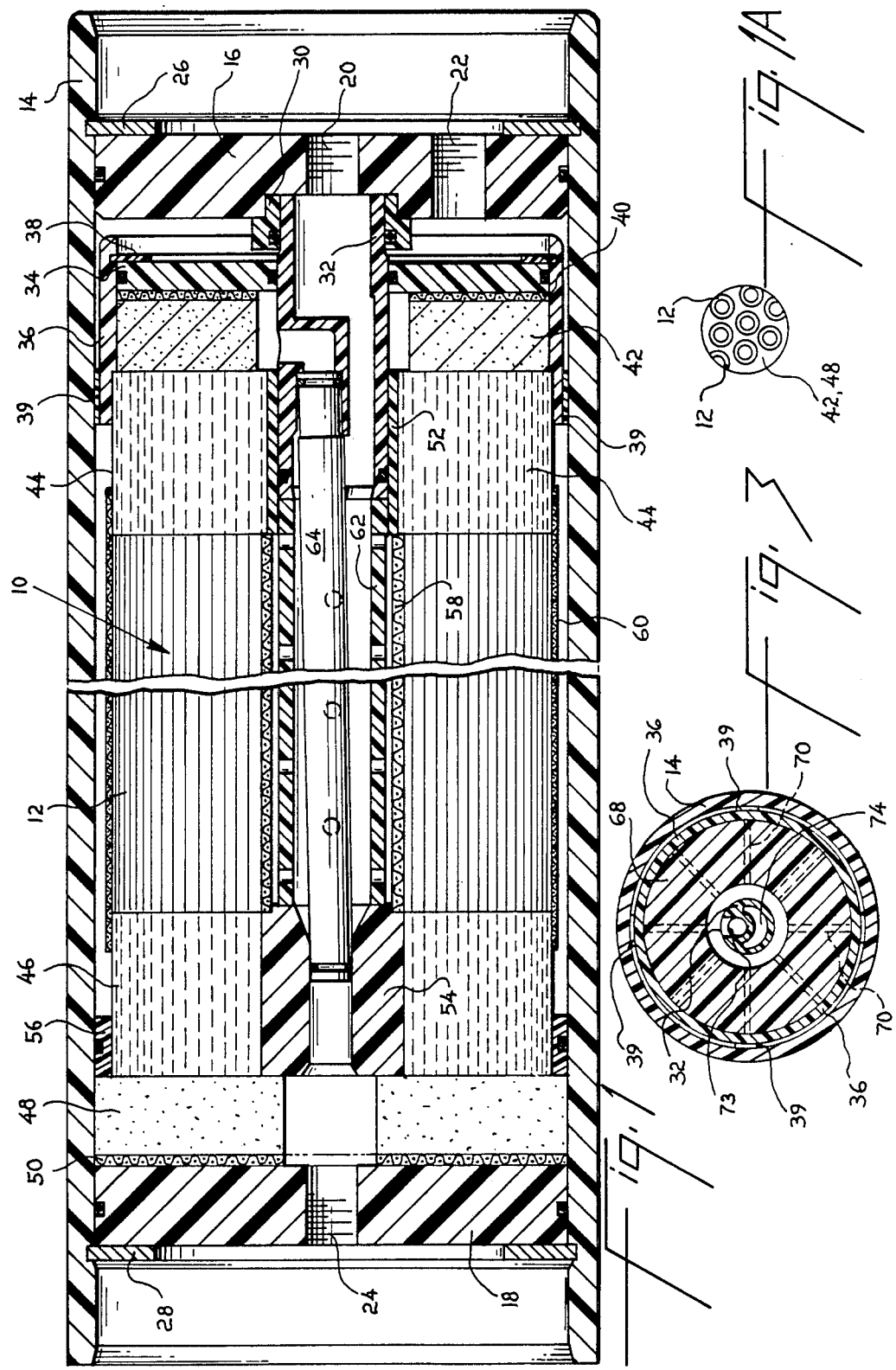
FIG. 1 is a longitudinal cross section through a first embodiment of a permeator in which the improvements of the present invention have been incorporated.

The permeator shown in FIG. 1 has a tubular array or bundle 10 of selectively permeable, hollow fibers 12 encased by a shell 14 and by end plates 16, 18. End plate 16 has a first port 20 through which a fluid to be treated is introduced and a second port 22 for the discharge of treated fluid. The permeate is discharged through a third port 24 in end plate 18. End plates 16, 18 are held in place by segmented rings 26, 28 and their peripheries are sealed to shell 14 by O-rings.

A recess on the inside of end plate 16 receives the reduced end of a bushing 30 which, in turn, receives and is sealed to an adaptor 32 by an O-ring. Structural details of the adaptor or dual passage connector 32 will be described below in connection with FIGS. 2 and 3. Next to the bushing 30, there is a cover plate 34 which is contained with respect to a shroud 36 by a snap ring 38. Cover plate 34 is sealed to shroud 36 and to adaptor 32 by O-rings. Shroud 36 is supported in spaced relationship to shell 14 by four shims 39. A screen 40 and a block 42 of porous alumina fit between cover plate 34 and a tube sheet 44 at one end of bundle 10. Shroud 36 is bonded to tube sheet 44. At the other end of bundle 10, there is another tube sheet 46, a porous block 48 and a screen 50 which abuts the end plate 18.

Tube sheets 44, 46 are built up using an epoxy resin and support the open ends of the hollow fibers 12 (FIG. 1A). Tube sheet 44 is bonded to a sleeve 52 which is adapted to slide on the adaptor 32. Adaptor 32 is sealed to the sleeve 52 by an O-ring. Tube sheet 46 is bonded to a bushing 54 and has a built-up rim 56 which is sealed to shell 14 by an O-ring. Between the tube sheets, there is an exposed length of bundle 12 which is covered by inner and outer flow screens 58, 60 of VEXAR ® plastic netting.

Within screen 58, there is a perforated first tube 62 and an imperforate second tube 64. One end of tube 62 fits in sleeve 52. Its ends abut adaptor 32 and bushing 54. Tube 64 is disposed angularly, with one end fitted into adaptor 32 and the other end fitted into a passage through bushing 54. Its ends are sealed to the adaptor and the bushing by O-rings.

When the permeator has been installed and placed in use, a fluid feedstock such as salt water is introduced under pressure through the first port 20. It flows through adaptor 32 and the perforations in first tube 62 and radially through the bundle 10. The product or permeate, fresh water, enters hollow fibers 12 by reverse osmosis and flows through the open ends of the fibers to porous blocks 42, 48. The permeate from block 42 flows through adaptor 32, tube 64 and bushing 54 to the third port 24. The permeate from block 48 flows directly to port 24. The rejected brine flows through screen 60 and the open spaces between shroud 36 and shell 14 to the second port 22.

Prior to and during use, shrinkage of the fibers may occur due to variations in fiber temperature. Shrinkage of up to 1% is accommodated by providing for movement between shroud 36 and shell 14 as well as between sleeve 52 and adaptor 32.

The invention achieves the important benefits of double ending while advantageously doing so in the same space envelope and with the same economical external porting typically used in a single end design. Double ending compared to single ending reduces the pressure drop along the fiber bore, thereby increasing the driving pressure across the wall of the fiber for a given feedstock pressure. This results in a substantial increase in throughput of permeate and results in a dilution of the small amount of undesirable salt in the permeate. This dilution occurs since the passage of undesirable salt through the fiber wall is nearly constant while the passage of permeate water is increased by the greater driving pressure.

Figure 2:
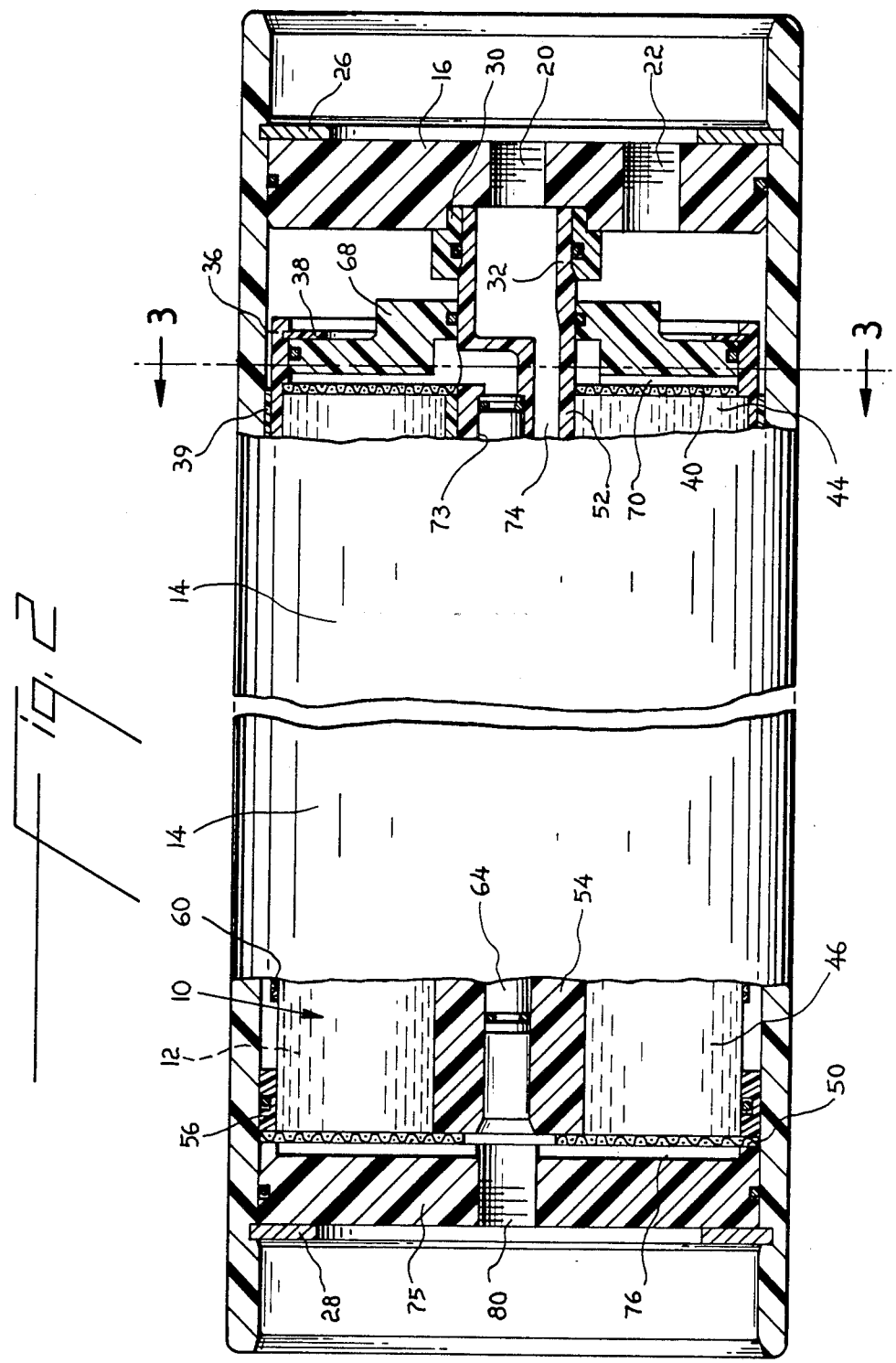
FIG. 2 is a plan view of a second embodiment of the permeator. Parts have been broken away and shown in section to reveal details of construction.

The differences between the embodiments shown in FIGS. 1 and 2 are that, in FIG. 2, the porous blocks have been omitted and adjacent parts have been modified or relocated. Where the same parts appear as in FIG. 1, the same reference characters have been applied.

As shown in FIG. 2, screen 40 bears against one end of bundle 10 and is held in place by a cover plate 68. On its inside surface, plate 68 has grooves 70 (FIGS. 2 and 3) which empty permeate from the open ends of fibers 12 to tube 64 through adaptor 32. Adaptor 32 is a dual passage connector which, in the embodiments of FIGS. 1, 2 and 4, is machined or molded out of plastic. A first passage 73 is off-center, round and receives the tube 64. At the location shown in FIG. 3, the second passage 74 is kidney-shaped to maximize the flow between port 20 and the perforated tube.

At the other end of the permeator, screen 50 is held in place by an end plate 75 having grooves 76 through which permeates flows from the open ends of fibers 12 to a third port 80 which also receives the permeate from tube 64.

The principal advantage of the embodiment shown in FIG. 2 is that omission of the porous blocks leaves room in a shell 14 of standard length for a greater exposed length of fibers 12 and thereby provides a further improvement in productivity.

In the embodiment shown in FIG. 4, the parts are the same at one end as in FIG. 2 and at the other end as in FIG. 1. Accordingly, the same reference characters used in FIGS. 1 and 2 have been applied in FIG. 4. This embodiment has been chosen as a prototype for evaluation.

An embodiment adapted for the separation of gases, e.g., carbon dioxide and hydrogen from methane, is shown in FIG. 5. Gas under pressure can be introduced through a port 22' for flow around the periphery of tube sheet 44' and through bundle 10' to perforated tube 62'. Tube 62' exhausts through connector 32' to port 20'. At one end, permeate flows from the open ends of the fibers in bundle 10' through a porous block 42' and connector 32' to tube 64' and port 24'. At the other end, permeate flows through a porous block 48' directly to port 24'. In this embodiment, connector 32' is part of a welded metal sub-assembly including perforated tube 62' and imperforate tube 64'.

What is claimed as new and desired to be secured by letters patent is:

1. In a permeator including an elongated casing and a perforated first tube within an encased bundle of hollow fibers having a tube sheet at each end thereof, the improvement comprising provision of an imperforate second tube within said first tube, an adaptor at one end of the bundle and a bushing within the tube sheet at the other end of the bundle, said fibers having open ends embedded in said tube sheets, said casing having first and second ports at one end thereof and a third port at the other end, the open ends of said fibers at said other end of the bundle being in communication with said third port, said adaptor being a connector having a first passage in communication with said first port and with said first tube and a second passage in communication with the open ends of said fibers at said one end of the bundle and with said second tube, said second tube extending into said bushing and being in communication therethrough with said third port, the open ends of said fibers at said other end of the bundle also being in communication with said third port and there being a flow path through said bundle between the perforated first tube and said second port.

2. The permeator of claim 1 wherein said casing is tubular and provided with end plates, said first and second ports being in the end plate at said one end, said third port being in the end plate at said other end.

3. The permeator of claim 2 wherein a porous block is positioned between each end plate and the adjacent tube sheet.

4. The permeator of claim 2 wherein is provided a screen in engagement with each tube sheet.

5. The permeator of claim 2 wherein is provided a screen in engagement with the tube sheet at said one end and a porous block in engagement with the tube sheet at said other end.

6. The permeator of claim 2 wherein said first port is an inlet for fluid to be treated, said second port is an outlet for treated fluid and said third port is an outlet for permeate.

7. The permeator of claim 2 wherein said second port is an inlet for fluid to be treated, said first port is an outlet for treated fluid and said third port is an outlet for permeate.

* * * * *